United States Patent
Johannesen

(10) Patent No.: US 7,355,383 B2
(45) Date of Patent: Apr. 8, 2008

(54) CROSS COIL INSTRUMENT WITH A PREDEFINED CHARACTERISTIC

(75) Inventor: Finn Johannesen, Skive (DK)

(73) Assignee: DEIF A/S, Skive (DK)

( * ) Notice: Subject to any disclaimer, the term of this patent is extended or adjusted under 35 U.S.C. 154(b) by 437 days.

(21) Appl. No.: 10/510,761

(22) PCT Filed: Apr. 10, 2003

(86) PCT No.: PCT/DK03/00242

§ 371 (c)(1),
(2), (4) Date: Oct. 12, 2004

(87) PCT Pub. No.: WO03/088639

PCT Pub. Date: Oct. 23, 2003

(65) Prior Publication Data
US 2005/0189935 A1    Sep. 1, 2005

(30) Foreign Application Priority Data
Apr. 10, 2002   (DK) .............................. 2002 00535

(51) Int. Cl.
G01R 1/20  (2006.01)
(52) U.S. Cl. .................................. 324/143; 336/189
(58) Field of Classification Search ........ 324/143–146, 324/149, 151 R, 151 A; 335/222, 282; 336/188–189
See application file for complete search history.

(56) References Cited

U.S. PATENT DOCUMENTS

| 4,217,651 A | 8/1980 | Pickering |
| 4,827,210 A | 5/1989 | Duffait et al. |
| 5,061,891 A | 10/1991 | Totsuka et al. |
| 5,414,350 A | 5/1995 | Chellman |
| 5,708,214 A | 1/1998 | Kiguchi |

FOREIGN PATENT DOCUMENTS

| EP | 0373982 | 6/1990 |
| GB | 2280268 | 1/1995 |

*Primary Examiner*—Bot LeDynh
(74) *Attorney, Agent, or Firm*—James Creighton Wray; Clifford D. Hyra

(57) ABSTRACT

The present invention relates to the visual representation of an input value, and provides an instrument, which can be given any predefined characteristic of its visual display. Cross-coil instrument is provided, said cross-coil instrument comprising a driver for the instrument characterized in that it further comprises a digital input terminal, a predetermined characteristic of the instrument stored as a map of input/output values in a digital memory and a microprocessor, said input value being a value represented visually by the cross-coil instrument, said output value being the value applied to the cross-coil instrument to visual represent the input value.

12 Claims, 5 Drawing Sheets

| 21 | 20 |
|---:|---:|
| 0,0 | 0,5 |
| 22,5 | 22,5 |
| 45,0 | 43,5 |
| 67,5 | 65,0 |
| 90,0 | 86,0 |
| 112,5 | 107,5 |
| 135,0 | 131,0 |
| 157,5 | 154,0 |
| 180,0 | 178,5 |
| 202,5 | 203,0 |
| 225,0 | 226,5 |
| 247,5 | 249,5 |
| 270,0 | 272,0 |
| 292,5 | 294,0 |
| 315,0 | 316,0 |
| 337,5 | 338,5 |

Fig. 2

| 21 | 20 | 22 |
|---:|---:|---:|
| 0,0 | 0,5 | 0,0 |
| 22,5 | 22,5 | 21,5 |
| 45,0 | 43,5 | 43,0 |
| 67,5 | 65,0 | 64,0 |
| 90,0 | 86,0 | 85,5 |
| 112,5 | 107,5 | 107,5 |
| 135,0 | 131,0 | 130,0 |
| 157,5 | 154,0 | 153,5 |
| 180,0 | 178,5 | 178,0 |
| 202,5 | 203,0 | 203,0 |
| 225,0 | 226,5 | 226,5 |
| 247,5 | 249,5 | 249,0 |
| 270,0 | 272,0 | 271,0 |
| 292,5 | 294,0 | 293,0 |
| 315,0 | 316,0 | 315,0 |
| 337,5 | 338,5 | 338,0 |

Fig. 4

CROSS COIL INSTRUMENT WITH A PREDEFINED CHARACTERISTIC

This application claims the benefit of Danish Application No. 2002 00535 filed Apr. 10, 2002 and PCT/DK03/00242 filed Apr. 10, 2003.

BACKGROUND OF THE INVENTION

The present invention relates to a cross-coil instrument with a predefined characteristic as well as a method for giving the instrument such a characteristic. More particularly the invention relates to a cross-coil instrument with a highly linear characteristic or a characteristic with linearity with different constants in different areas of the scale.

Conventional instruments with a highly linear characteristic are manufactured with moving-coil instruments. This is disadvantageous because moving-coil instruments with a highly linear characteristic are expensive. Furthermore, the indicating device of a moving-coil instrument is limited in rotation, because wires are connected to the rotating device. Another drawback on moving-coil instruments is that the indicating device has to be light-weight. This makes the instrument sensitive to static electricity and makes it vulnerable to mechanical stress, which can change the calibration of the instrument.

Conventional cross-coil instruments are used for various measuring and display purpose. For instance, for process-indication, measuring the level of liquid or temperature as rudder angle-indicators or else as a voltmeter and an ammeter. A cross coil type instrument includes a movable permanent magnet around which a plurality of coils are cross-arranged. Currents based on a quantity to be measured pass through the coils, which generate a composite magnetic field. The movable permanent magnet having a needle is rotated due to the generated composite magnetic field. The known cross-coil moving magnet measuring instruments have a core, which is used as winding form and within which the moving magnets are rotable supported. From one end of the core an extension protrudes, in which the shaft of the moving magnet is positioned, the magnet receiving the indicating device, which is extended out of said extension. Although, such known cross-coil instruments are linear to some degree, they fail in applications, where highly linear and accurate display is required. In applications, where the angles of its deflexion are greater than 90°, the calibration in one quadrant of the instrument can counteract the calibration in other quadrants of the instruments. Such calibration problems can make it difficult to achieve linearity. In other applications it would be desirable to have a highly un-linear characteristic. That would be the case, when the instrument has to show low values with high resolution and higher values with a low resolution. There is no easy way to change the characteristic of the known cross-coil instrument.

It is therefore the object of the invention to provide a cross-coil instrument with a characteristic which can be predefined. Such an instrument would be capable to receive an electrical input value and visually display that value with a predefined angle of deflexion.

SUMMARY OF THE INVENTION

This object is achieved by a cross-coil instrument comprising a driver for the instrument characterized in that it further comprises a digital in-put terminal, a predefined characteristic of the instrument stored as a map of input/output values in a digital memory and semiconductor based logic, the input value being a value represented visually by the cross-coil instrument, said output value being the value applied to the cross-coil instrument to visually represent the input value. In this application, the term microprocessor is used as a generic term for semiconductor logic. The map of input/output values in the digital memory is a number of calibration points which are used by the microprocessor to change the input value to a new value which is led to the driver of the instrument. If the value is not in the digital memory, the microprocessor interpolates the new value from two existing calibration points on either side of the actual value.

The present invention relates to the visual representation of an input value, and provides an instrument, which can be given any predefined characteristic of its visual display. The instrument of this invention relies on an already calibrated input value, but it is also possible to provide the instrument with additional features known to a man skilled in the art to calibrate an input value, for example a value received from a sensor.

The use of the present invention gives the possibility of using a low-cost cross-coil instrument while still achieving a high linearity or another predefined characteristic of the instrument. Furthermore, the use of the present invention makes it possible to use a heavy indicating device, which is less vulnerable to static electricity and vibrations. When the instrument is manufactured the calibration point can be adapted to the specific cross-coil instrument used or to the specific type of cross-coil instruments used. The use of a digital input terminal enables possibilities for several bus protocols, for instance CAN Bus, NMEA Bus or MOD Bus.

In a further embodiment of the invention said semiconductor based logic is selected from the group of semiconductor based logic comprising microprocessor, microcontroller, Field Programmable Gate Array (FPGA), rom, prom, pic, dsp. The choice of the type of semiconductor based logic depends on the need for speed and other features such as the possibility to program the logic while it is mounted on the print.

In another embodiment of the invention the predefined characteristic is linear.

In a further embodiment of the invention the predefined characteristic is non-linear, such that the output scale of the instrument is non-linear. This is advantageous, if it is necessary to have high resolutions in some part of the scale and lower resolutions in other parts of the scale. This could be the case, when it is needed to read the frequencies near 50 and 60 Hz with high accuracity, while the frequency in between said frequencies only need to be read with a lower accuracity.

In a still further embodiment of the invention cross-coil instrument comprises an analogue input terminal and an analogue to digital converter. The converter is connected between the analogue input terminal and the digital input terminal. The use of this embodiment of the invention makes it possible to connect the instrument directly to an analogue signal.

In another embodiment of the invention the instrument is illuminated and the microprocessor comprising means for dimming the illumination of the instrument. In some applications, for instance on a bridge on a ship, it is necessary to change the illumination of the instrument, when the ambient illumination changes. At night time it is necessary to lower the illumination of the instrument to keep the night view of the people on the bridge.

In another embodiment of the invention an indication device of said instrument is able rotate more than 360°. This is especially useful in propeller position indicators in a ship with rotating drive systems or in various instruments in trains.

The use of a microprocessor in the instrument makes it possible to add functionality to the instrument with low-costs. In a further embodiment of the invention, the instrument is provided with means for error-detection, means for indication of error, means for test-routines or error-correcting means, such as offset-adjustment or self-calibration.

For example, the microprocessor can measure the current to the wires of the cross-coil instrument. If the current does not have the expected size, the microprocessor indicates that using the means for indication of error. The processor can also detect invalid input, for example a missing input. The instrument can also be provided with another processor, which acts as watch-dog. In this case the first microprocessor has to send a signal at regular intervals that indicates that everything is functioning. If the watch-dog does not receive the expected signal, it can signal an error. The means for indication of error can be a sound or light-signal in the instrument. The signal can also be sent on the digital interface so it can be handled by an external system or the cross-coil instrument itself can be used. In the latter case, an error will be easily detectable if the indication device moves in a specific error-pattern, for example slowly from side to side like the washers of a car.

The means for test-routines can ensure the user, that the instrument is calibrated correctly by moving the indicating device to a number of predefined positions when the test-routines are running, for example on power-up or when a run of test-routine is requested manually. The user can then validate, that the instrument is correct calibrated and eventually initiate the calibration of the instrument.

The error-correcting means can comprise a disc mounted on the cross-coil instrument in such a way, that it rotates together with the indicating device. Alternatively, the disc can be identical with the indicating device. The disc is provided with a number of holes. An LED and light-sensor is provided to detect when a hole is positioned between the LED and light-sensor. By using this information, the microprocessor can control the position of the indicating device on a number of predefined positions. This information can be used to recalibrate the instrument automatically or on request from the user. The microprocessor can also use the information to decide, if the indication device is not moved at all. If that is the case, the microprocessor can try to unfreeze the indicating device, for example by using a large current for a short time.

In a still further embodiment of the invention the background of the instrument comprises a liquid crystal display (LCD). The LCD can be used to change the scale. This could be necessary, if measuring units is changed. The use of LCD makes it also possible to get a digital readout together with the analog readout from the indicating device.

The invention also discloses a method which is particular in that it changes the characteristic of a cross-coil instrument by reading an input value and calculates a new value by means of calibration points stored in digital memory and applying the new value to the driver of the cross-coil instrument. The calibration points stored in digital memory can be specific for the specific type of cross-coil instrument used or specific for the individual cross-coil instrument used. The process of reading an input value and calculate a new value can be done by semiconductor logic, such as a microprocessor, microcontroller, Field Programmable Gate Array (FPGA), rom, prom, pic or dsp. The calibration points are used to obtain a predefined characteristic of the visual display of the instrument. The calibration points map input values, which are represented visually by the instrument to output values which are applied to the cross coil instrument to obtain the required deflexion of the instrument.

The invention also discloses a method which is particular in that it determines a map of input/output values of an digital memory of a cross-coil instrument comprising the steps of selecting a number of input values and their desired, corresponding angles of the instrument, for each pair of input values and desired, corresponding angles adjusting the input value of the instrument, until the desired angle is obtained, selecting the value which should correspond to the actual angle as the input value of the map, selecting the input value as the output value of the map. This method can be applied to every single individual manufactured instrument, so that the map is specific for every single cross-coil, or the method can be applied to an average of a specific type of cross-coil instrument. The latter application is less expensive, and useful when it is known that the characteristic of different individual cross-coil instrument of a specific type does not differ much from each other. This could be the case, where a large series of instruments are produced on the same machines.

The invention also discloses a method which is particular in that it comprises the step of using a camera to detect when the desired angle is obtained. The use of a camera can reduce the costs of the calibration, because the calibration can be done automatic at production time on every single instrument.

The invention is described by way of example only with reference to the accompanying drawings, in which

BRIEF DESCRIPTION OF THE DRAWINGS

FIG. 2 represents a map of input/output values,

FIG. 4 shows a map of input/output together with direction of movement,

DETAILED DESCRIPTION OF THE PREFERRED EMBODIMENTS

Figure 1:
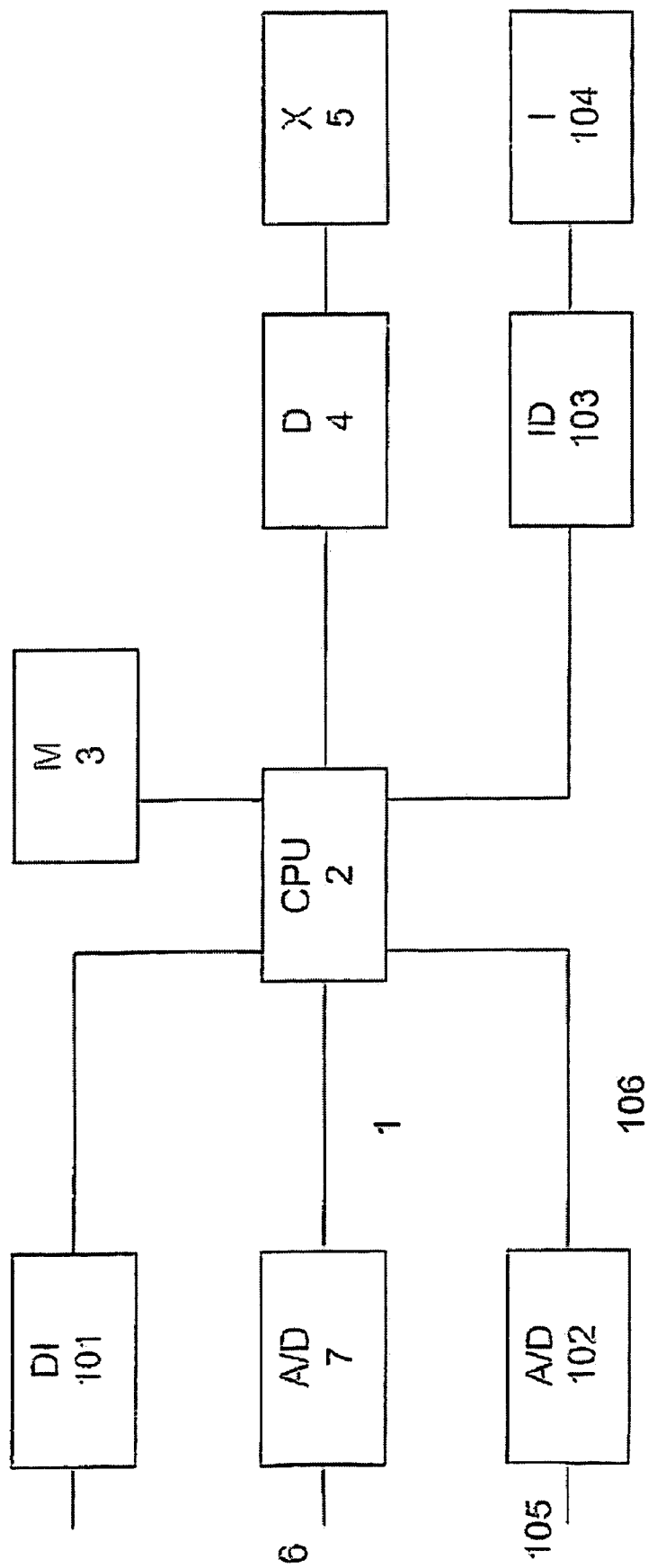
FIG. 1 is a block diagram of the invention.

In the block diagram of the invention shown in FIG. 1 the digital input terminal 1 is connected to the microprocessor 2. The microprocessor is connected to the memory 3, which contains the map of input/output values being used by the microprocessor to manipulate the input value from terminal 1, before it is led to the driver 4. The driver 4 drives the cross-coil instrument 5. The driver 4 converts the signal received from the microprocessor 2 to analog signals with a different phase. The angle between the different signals ideally results in a positioning of the indicating device of the cross-coil instrument in the same angle. The cross-coil instrument 5 can be of different types. For instance, the indicating device of the instrument can be able to rotate 90, 240, or more than 360 degrees. Since the cross-coil instrument 5 not is perfect, the angle of the indicating device is not always the same as the angle between the signals received from the driver 4. The digital input terminal can for example be serial, parallel, a microprocessor or a bus-system. The microprocessor 2 can be any semiconductor based logic, for example FPGA, PROM, simple logic from the 4000 family, a PIC, a microcontroller, or a DSP depending on for example the need of speed for the processor, the price or the complexity of other functions of the microprocessor. The memory 3 can be volatile or non-volatile and must be large enough to contain the map of input/output values necessary to achieve the predefined characteristic of the instrument. It is advantageous that it is possible to program the memory when the memory is mounted on the print. This is for example possible when the memory is integrated in a PIC or a microcontroller.

One embodiment of the invention is provided with an analog to digital converter 7 and an analog input terminal 6. With an analog input terminal 6 it is possible to connect the instrument directly to analog sources. An optional digital interface 101 provides means for communicating the readout of the instrument or other information from the instrument, for example the content of the memory 3 to other accessories on a bus-system, for instance CAN Bus, MOD Bus, NMEA Bus or a serial bus-system. The optional digital interface 101 can also be used for the initial or any later calibration or validation. The possibility to read out information from the instrument can be advantageous, if the instrument is found to be out of calibration. The information can be used to trace an error or to get information on how the cross-coil instrument changes its physical behavior over time.

Optional means for controlling the illumination of the instrument is provided with a digital input terminal 106 which receives a control signal for the illumination together with the driver 103 which drives the illumination of the instrument. The system can be extended with an analog to digital converter 102 and an analog input terminal 105 to receive an analog control signal for the illumination 104.

FIG. 2 shows a map of input/output values which are used to achieve a pre-defined display of a specific cross-coil instrument. The value, which should be represented visually by the instrument, is located in the second column 20. This is the input value received from a source, which could be a sensor. The output values are the values in the first column 21. It is the values which are necessary to apply to the cross-coil instrument to obtain that the cross-coil instrument visually represent the corresponding value in the second column 20. When the processor 2 receives an input value, for example 154, it will look up the value in the table in the input column 20, and then output the corresponding output value from the output column 21, which in this case is 157.5. If the input value is not in the table the processor will make an interpolation to achieve an output signal. This interpolation can be linear, exponential, sinusodial, or another function.

Figure 3:
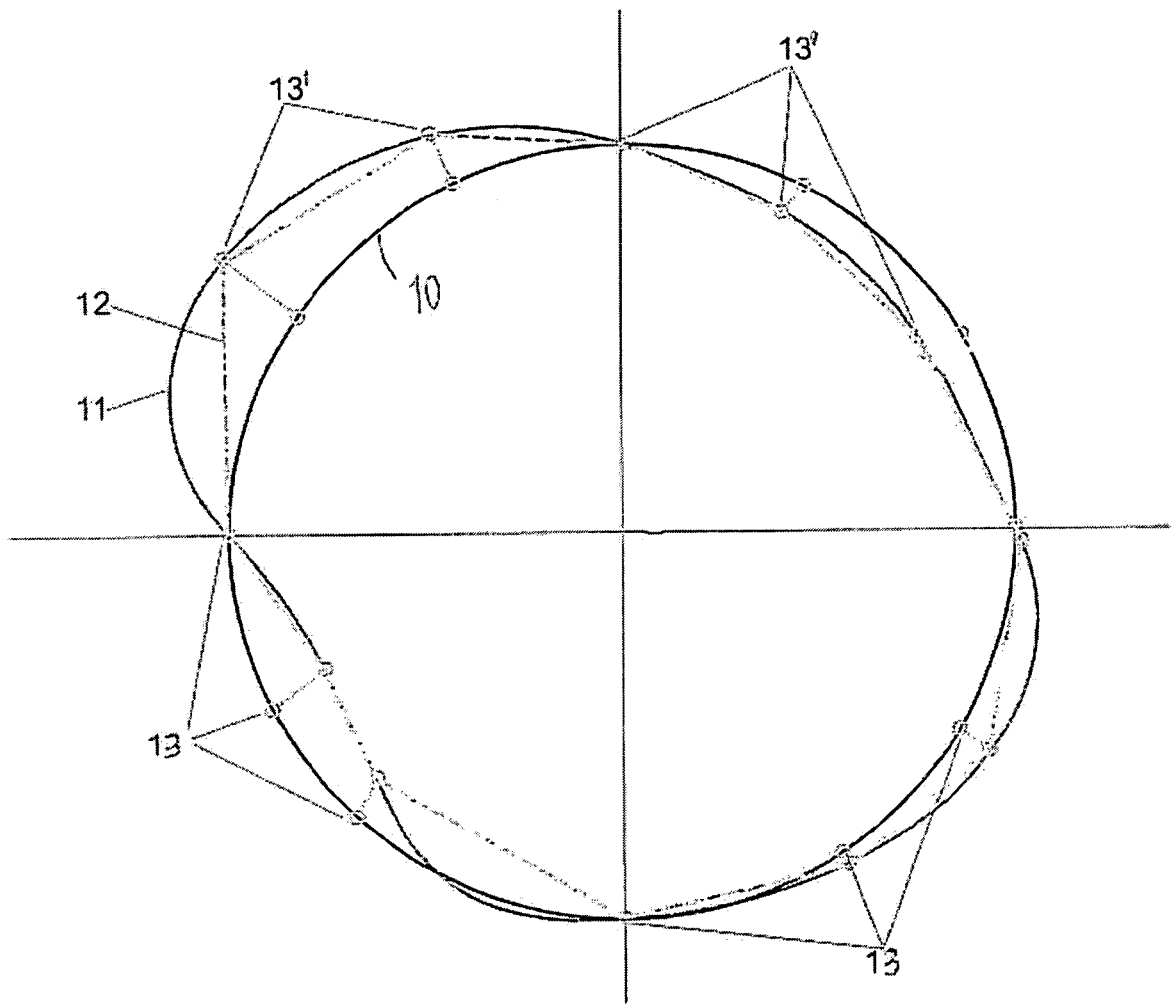
FIG. 3 shows another map of input/output values.

In FIG. 3 the input values are represented by a circle 10. The output value is shown by the curve 11. When a point 13 on the input value circle 10 has to be displayed, the curve 11 of output values has a corresponding point 13', which represents the value, which has to be applied to the displaying cross coil instrument through the driver for a correct display of the indicating device of the cross coil instrument. Because the space of the memory is limited the output values are restricted to the points 13 and 13'. Even though memory is limited, it is also cheap, so there can exist a very high number of points if it is necessary to obtain the required precision of the visual representation. The curve 12 shows the interpolated output values, which of course will become better, when more points are used.

In FIG. 4 the map is extended by an extra set of output values 22. The use of such an extended map is useful, when the instrument react in different ways with respect to the direction of movement of the indicating device. In one embodiment of the invention, the processor comprises means for determining the direction of movement of the indicating device, and calculates output values based on one set of output values 20 for one direction and another set of output values 22 for another direction.

Figure 5:
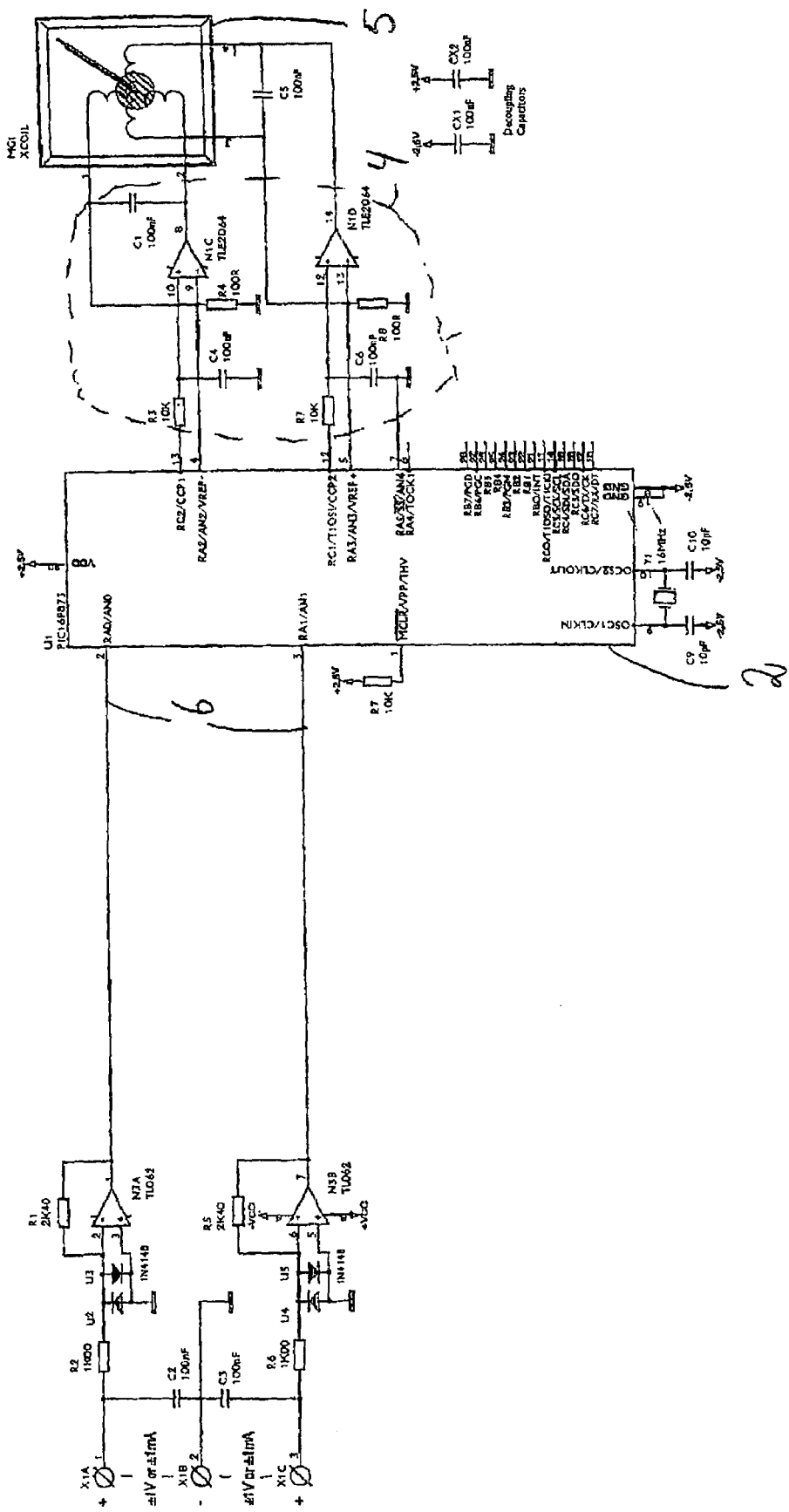
FIG. 5 shows a schematic of a part of one embodiment of the invention.

In FIG. 5 a diagram shows a cross-coil instrument 5 connected to the driver 4. The microprocessor 2 is a PIC with integrated memory analog terminal 6 with analog to digital converter. A list with the used components is below.

| | | Bill of Materials | |
|---|---|---|---|
| Item | Quantity | Reference | Part |
| 1 | 8 | CX1, C1, CX2, C2, C3, C4, C5, C6 | 100 nF |
| 2 | 1 | C7 | 10 uF |
| 3 | 1 | C8 | 470 pF |
| 4 | 2 | C9, C10 | 10 pF |
| 5 | 2 | C12, C11 | 22 uF |
| 6 | 2 | C13, C14 | 47 uF |
| 7 | 1 | D1 | SMBJ33CA |
| 8 | 1 | D2 | LM336-2.5V |
| 9 | 1 | MG1 | XCOIL |
| 10 | 1 | N1 | TLE2064 |
| 11 | 1 | N2 | TLE2062 |
| 12 | 1 | N3 | TL062 |
| 13 | 2 | R1, R5 | 2K40 |
| 14 | 2 | R2, R6 | 1K00 |
| 15 | 11 | R3, R7, R9, R11, R12, R13, R14 R16, R18, R19, R21 | 20K0 |
| 16 | 2 | R4, R8 | 100R |
| 17 | 2 | R10, R15 | 2K00 |
| 18 | 2 | R17, R20 | 250R |
| 19 | 1 | T1 | RM5-24V |
| 20 | 1 | U1 | PIC16F873 |
| 21 | 4 | U2, U3, U4, U5 | 1N4148 |
| 22 | 5 | U6, U7, U8, U9, U10 | BYD77G |
| 23 | 1 | X1 | LDG-A-30 |
| 24 | 1 | Y1 | 16MHz |

To ensure that the correct force is applied to the indicating device of the cross-coil instrument, a further embodiment of the invention is provided. This embodiment takes into account that a cross-coil instrument has unlinearities regarding the angle of the indicating device and that different strength of signal has to be applied to different cross coil instruments at different angles to provide that the indicating device is held at a given angle with a given force. In this embodiment, the input/output values are vectors, so that the driver can obtain the necessary information to provide the correct signal to the instrument.

Figure 6:
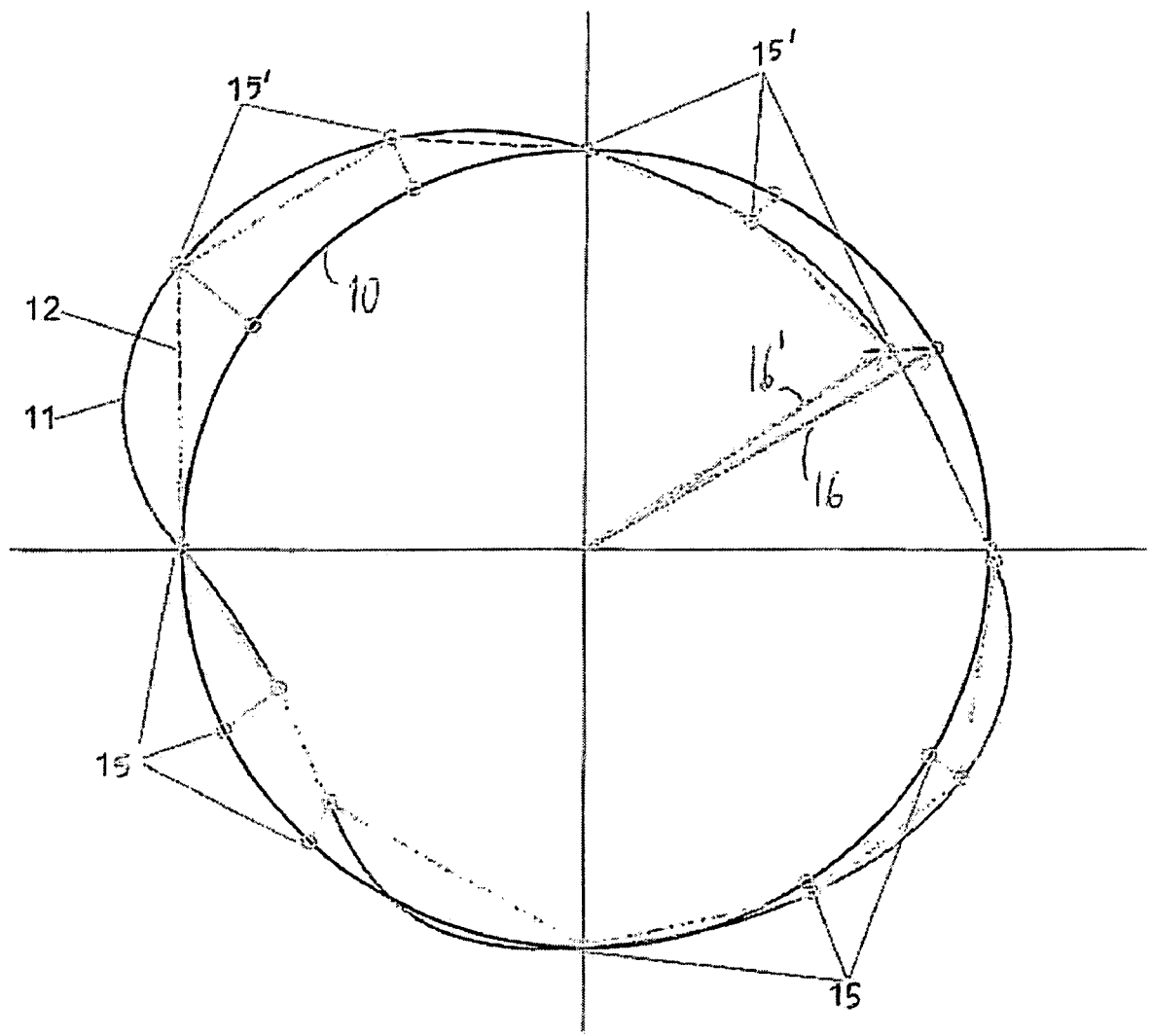
FIG. 6 shows another map of input/output values comprising both angle and amplitude.

An example is shown FIG. 6, where a limited number of input values 10' is represented located on a perfect circle 10. In this figure, the diameter of the circle represents the force, which should maintain the indicating device on the correct position, and the angle as the value, which should be represented visually by the indicating device of the cross-coil instrument. The output values 15' located on the curve 11 correspond to the input values 15. Both the input value points 15 and the output value points 15' are vectors. This map can be used to adjust both the angle and the amplitude of the input value before it is applied to cross coil instrument through the driver. For example, for this given map, the output vector 16' has to be applied to the cross coil instrument, when the input value vector 16 has to be represented visually by the indicating device. The microprocessor adjusts the input with respect to angle as well as amplitude. In this embodiment, the driver used uses both the angle and the amplitude as input. Because the space of the memory is limited the output values are restricted to the points 15', and the number of input values are restricted to the points 15. Even though memory is limited, it is also cheap, so there can exist a very high number of points if it is necessary to obtain the required precision of the visual representation. The curve 12 shows the interpolated output values, which of course will become better, when more points are used.

The invention claimed is:

1. Cross-coil instrument comprising a driver for the instrument wherein it further comprises
   a digital input terminal
   a predetermined characteristic of the instrument stored as a map of input/output values in a digital memory
   semiconductor based logic, said input value being a value represented visually by the cross-coil instrument, said output value being the value applied to the cross-coil instrument to visually represent the input value.

2. Cross-coil instrument according to claim 1, where said semiconductor based logic is selected from the group of semiconductor based logic consisting of microprocessor, microcontroller, Field Programmable Gate Array (FPGA), rom, prom, pic, and dsp.

3. Cross-coil instrument according to claim 1, where said characteristic is linear.

4. Cross-coil instrument according to claim 1 where said characteristic is non-linear, such that the output scale is non-linear.

5. Cross-coil instrument according to claim 1 comprising an analogue input terminal, an analogue to digital converter connected to the analogue input terminal and the digital input terminal.

6. Cross-coil instrument according to claim 1 where the indicating device of said instrument is able to rotate more than 360 degrees.

7. Cross-coil instrument according to claim 1 where said instrument is illuminated and optionally the semiconductor based logic comprising means for dimming the illumination of the instrument.

8. Method of obtaining a predefined characteristic of a cross-coil instrument comprising the step of
   read an input value by semiconductor based logic,
   calculate a new value by using the input value and information in a digital memory which represent said predefined characteristic,
   use said new value as the input signal to the driver of said cross-coil instrument.

9. Method according to claim 8, wherein said semiconductor based logic is selected from the group of semiconductor based logic consisting of microprocessor, microcontroller, Field Programmable Gate Array (FPGA), rom, prom, pic and dsp.

10. Method of changing the characteristic of a cross-coil instrument comprising the steps of
    read an input value
    calculate a new value by means of calibration points stored in digital memory
    apply the new value to the driver of the cross-coil instrument.

11. Method of determining a map of input/output values storing input/output values in a digital memory of a cross-coil instrument comprising the steps of
    defining a number of input values and their desired, corresponding angles of the instrument, and for each pair of input values and desired, corresponding angles adjust the input value of the instrument, until the desired angle is obtained,
    selecting the value which should correspond to the actual angle as the input value of the map,
    selecting the input value as the output value of the map.

12. Method of determining a map of input/output values of a digital memory of a cross-coil instrument comprising the steps of
    selecting a number of input values and their desired, corresponding angles of the instrument, and for each pair of input values and desired, corresponding angles adjusting the input value of the instrument, until the desired angle is obtained,
    selecting the value which should correspond to the actual angle as the input value of the map,
    selecting the input value as the output value of the map, further comprising the step of using a camera to detect when the desired angle is obtained.

* * * * *